Figure 1:
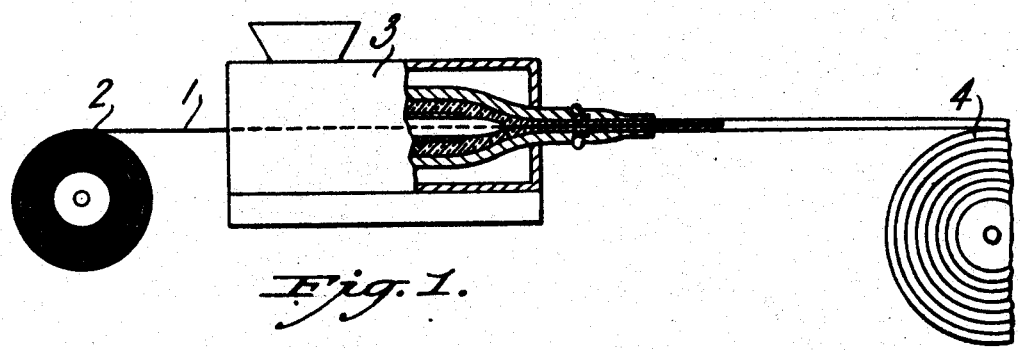

Patented Aug. 16, 1932

1,872,228

UNITED STATES PATENT OFFICE

THOMAS V. BINMORE, OF LONG ISLAND CITY, NEW YORK, AND HAROLD DE BLOIS RICE, OF BRISTOL, RHODE ISLAND, ASSIGNORS TO NATIONAL INDIA RUBBER COMPANY, OF BRISTOL, RHODE ISLAND, A CORPORATION OF RHODE ISLAND

METHOD FOR MAKING INSULATED WIRE AND PRODUCT OBTAINED THEREBY

Application filed October 19, 1926. Serial No. 142,777.

This invention relates to the manufacture of rubber insulated wire and particularly to the insulation of wire with a pre-vulcanized rubber compound.

According to the present practice, electric conductors are insulated with rubber compositions which are applied, in the case of the smaller flexible wires known as lamp cord, telephone wire, fixture wire, etc., over a serving of yarn or over a plating of tin placed on the bare copper, depending upon the size of the latter. The rubber insulation is always applied in the form of an unvulcanized composition and the application is carried out either by extruding the rubber composition directly around the conductor after it has been wound with yarn or plated with tin, or the rubber is applied in a strip wrapped around the conductor. In either instance, it is customary to subsequently vulcanize the rubber compound. This operation requires several cumbersome steps. When the rubber composition is applied by the tubing method, the coated wire, as it comes from the tubing machine, is coiled in a pan and dusted with talc, the operation being known as "panning". These pans, holding under 10,000 feet of wire, and usually less than 6,500 feet, are transported bodily into a vulcanizer. After the vulcanization the wire is removed from the pan and cleansed of the talc, this operation being known as unpanning or depanning. The talc or soapstone treatment, as well as the method of receiving the wire after the tubing operation, are employed to obviate any difficulty resulting from the sticky nature of unvulcanized rubber during the manufacturing operations. Another difficulty which is eliminated by panning is that caused by the tendency towards deformation of the unvulcanized rubber composition under slight pressure. This procedure is therefore almost universally employed before the rubber insulated wire can be wound on reels for storage, pending further manufacturing processes such as braiding, twisting, etc. In the so-called stripping method, which is frequently employed for larger sizes of conductors, the wire may be taken up on reels prior to vulcanizing; and it is also possible to braid jackets or to wind servings of yarn about the wire prior to vulcanizing; although neither of these may be considered standard practice. In general, the stripping method is much cleaner than the tubing method, for it is not the practice to resort to panning and unpanning in the stripping method. There is, however, a serious disadvantage in the stripping method—that it is well nigh impossible to obtain a uniform wall thickness of insulation, and particularly on the smaller conductors.

The primary object of the present invention is to furnish a method for insulating wire with a rubber compound which is not deformable at ordinary temperature, does not require vulcanization and is therefore free from the necessity of panning and unpanning. Another object of the invention is to provide a simple, rapid and inexpensive method of applying a vulcanized rubber compound to a metallic conductor or conductors. A further object is to provide a method for making insulated wire in continuous lengths of thousands of feet. Other objects will be apparent from the description and claims.

The invention may be briefly described as comprising applying a vulcanized insulating compound to a metallic conductor either solid, braided, or stranded, and subsequently applying jackets, coatings, and other wrappings when desired.

In Fig. 1 of the drawing is illustrated one manner in which a vulcanized rubber compound may be applied to a metallic conductor and the covered conductor reeled preparatory to applying a fibrous covering thereto.

Figure 2:
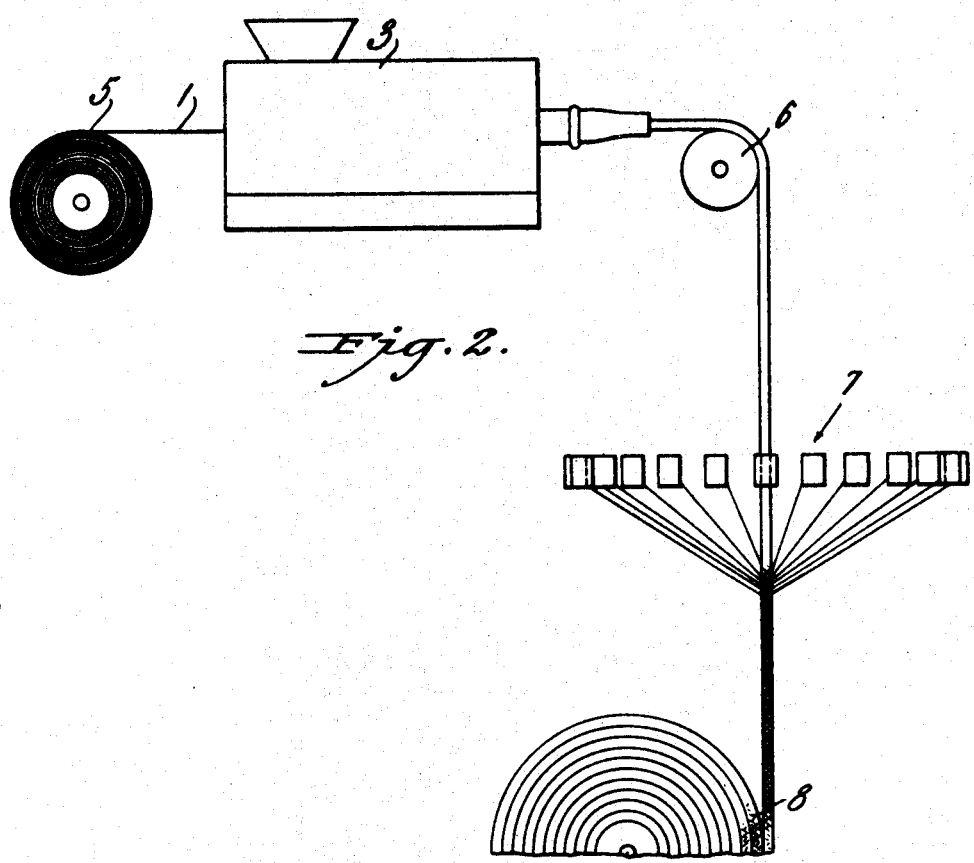

Fig. 2 is a diagrammatic illustration of how a conductor may be first covered with a vulcanized rubber compound and subsequently wrapped with a fibrous covering.

As one illustration of a suitable compound, vulcanized rubber is mixed with an equal weight of asphalt by softening the asphalt on a mixing mill and adding the vulcanized rubber to the asphalt after the latter has become a continuous layer on the mixing roll.

Mixing is continued until the vulcanized rubber has substantially disappeared from view. What actually happens is that the vulcanized rubber is reduced to very small coherent particles, and becomes substantially invisible as vulcanized rubber. To this mixture is added 7% of a wax such as Montan wax. The plasticity and other physical properties of this composition at ordinary temperatures greatly resemble those of heat-softened hard rubber. The composition is capable of setting rapidly to this physical condition upon cooling.

The above described vulcanized rubber-asphalt-wax composition may be plasticized on a mill to a sufficient degree to permit its being satisfactorily handled in the tubing machines used in insulation practice. The invention may be in part carried out by simply extruding this heated composition on to the wire, as illustrated in Fig. 1 wherein a wire 1 from roll 2 is passed through an extruder 3. Inasmuch as the composition has a certain degree of rigidity when cool, is not sticky, and resist deformation, the covered wire may be directly wound upon a reel 4. At this stage of manufacture, the invention has furnished a wire covered with a vulcanized rubber composition, which does not require any further heat treatment. One of the advantages of the present invention here becomes apparent. According to the improved process the cumbersome and expensive operations of panning, vulcanizing and unpanning are completely eliminated. The composition itself is quite inexpensive. Vulcanized rubber of high quality does not cost as much as most of the cheaper reclaims, and certainly is much less expensive than crude rubber. The asphalts are likewise inexpensive. Due to the property of the improved composition of maintaining its shape when cool, it may be readily seen that another advantage has been gained in the preclusion of flattening, which so often takes place with unvulcanized rubber composition. The Montan wax serves as a lubricant, but is not an essential ingredient of the composition. It may be replaced if desired with other waxes or softeners.

Inasmuch as the composition used herein is prevulcanized, there is at no stage of the process any risk of scorching the insulation compound, whereas this risk is always present even with low-grade insulation containing unvulcanized rubber and is particularly hazardous where the vulcanizable insulation contains organic accelerators. Another disadvantage which is overcome is that of blistering during vulcanization; since the material of the present invention is vulcanized before it is applied to the wire, no blistering can be caused by any moisture in the cotton or copper and as a result there will be no tendency of the improved insulation to be loosened from the wire. A particularly outstanding advantage of the present invention is that rubber-insulated conductors may be made in any desired length. For example, miles of wire may be made in a continuous length. The advantage derived here is not only in the absence of splicing but is also in the subsequent steps of braiding and wrapping. There is no time lost for splicing in braiding machines, and due to the fact that the length of wire is so great, a given number of braiding machines will require much less attention on the part of the operator, thereby accomplishing a saving in labor cost. The economy effected by the manufacture of long lengths of wire will also be noticeable during the commercial use of the wire, for splicings may be considerably reduced in number. Another advantage is that there are no migratory ingredients in the vulcanized insulation composition and there is no resulting action between the conductor and the ingredients, with the attendant reduction of insulating strength and increased short-circuit hazard.

Although in general, braiding machines do not operate as fast as tubing machines, it is possible, insofar as the insulating composition is concerned, to run the wire after the tubing operation directly through the braider, thus giving a continuous operation. Thus, as indicated in Fig. 2 wire 1 from roll 5 may be passed through an extruder 3 and through a cooling atmosphere directly into a braiding machine 7 after which it may be wound upon a reel 8. However, since no deformation results from reeling up the improved insulated wire directly after application of the rubber compound, the covered wire may be wound on reels and when convenient, braided or wrapped with yarn or tape or paper, or finished in any desired manner. Besides eliminating the cost of panning, vulcanizing and unpanning, no small benefit is gained by the elimination of the talc dust nuisance and its discomfort to the workman.

The vulcanized rubber composition herein described has a high electrical insulation value, and in addition is characterized by its unusual resistance to aging, whether oxygen, ozone, heat or ultra-violet light. In this respect the product more nearly resembles hard rubber. While in the above illustration a compound has been given as comprising equal parts of vulcanized rubber and asphalt, it is of course understood that these proportions may be changed, more or less rubber being used. It is also within the scope of the invention to employ compounding ingredients and other materials which add to the properties of the composition, but which do not require vulcanization. It is not the intention to include in the composition any unvulcanized rubber.

While in the above the vulcanized rubber-asphalt-Montan wax composition has been described as an insulator to be applied directly over the bare wire, the composition may also be used as an intermediate covering or as an outer covering over one or more suitably insulated conductors, and the same method of application may be employed. Braided or wrapped coverings may be applied as necessary, and these may be flame-resistant (asbestos, etc.) or fire-proofed, water-proofed and weather-proofed. The composition employed in this invention furnishes a low cost, high grade, vulcanized insulation or covering which can be applied with a tubing machine. The covered wire may be wrapped directly upon a reel placed behind the tubing machine, just far enough away from the tuber so that the composition has an opportunity to cool, which will take place in a few feet of travel.

Having thus described our invention, what we claim as new and useful and desire to secure by Letters Patents is:

1. An improved method for making insulated wire which comprises covering a metallic conductor with a single layer of homogeneous warm plastic insulating composition containing prevulcanized rubber, cooling and immediately applying protective material over the rubber insulation and finishing the insulated wire without vulcanization.

2. An improved method for making insulated wire which comprises extruding an insulating compound comprising vulcanized rubber and bituminous material over a metallic conductor, cooling, and immediately applying protective material over the rubber insulation and finishing the insulated wire without vulcanization.

3. An improved method for making insulated wire which comprises extruding an insulating compound comprising vulcanized rubber and bituminous material over a metallic conductor, cooling, winding up the insulated wire upon a reel, and subsequently applying thereto fibrous covering over the insulation and finishing the insulated wire without vulcanization.

4. An improved method for making insulated wire which comprises extruding an insulating compound comprising vulcanized rubber and bituminous material over a metallic conductor, cooling, winding up the insulated wire upon a reel, and subsequently braiding a jacket over the insulation and finishing the insulated wire without vulcanization.

Signed at New York, New York, this 8th day of October, 1926.

THOMAS V. BINMORE.

Signed at New York, New York, this 8th day of October, 1926.

HAROLD DE BLOIS RICE.